L. A. WILSON.
REPAIR STAND.
APPLICATION FILED FEB. 23, 1917.
1,278,273.
Patented Sept. 10, 1918.
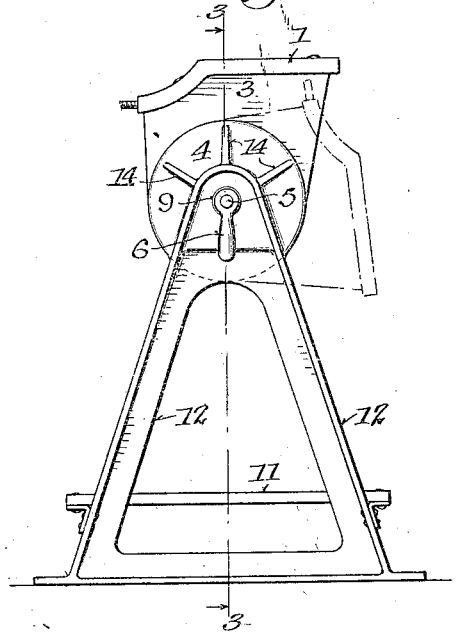
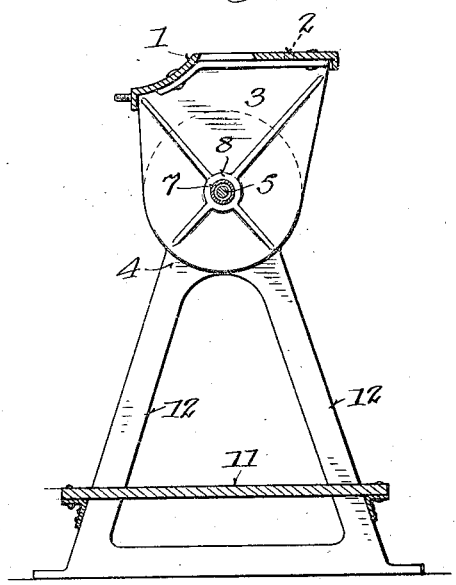
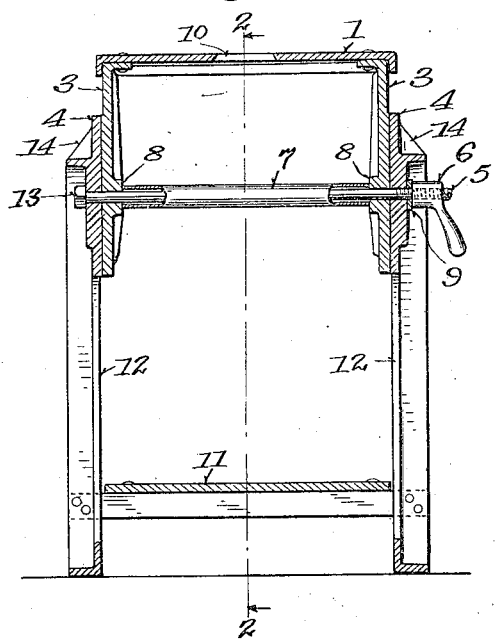
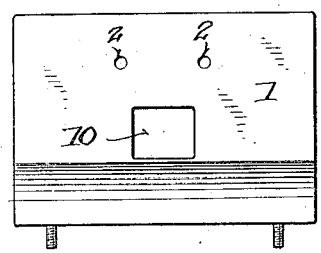
Inventor:
Leslie A. Wilson
By Erwin & Wheeler
Attorneys.

UNITED STATES PATENT OFFICE.

LESLIE A. WILSON, OF BERLIN, WISCONSIN.

REPAIR-STAND.

1,278,273.

Specification of Letters Patent.

Patented Sept. 10, 1918.

Application filed February 23, 1917. Serial No. 150,461.

*To all whom it may concern:*

Be it known that I, LESLIE A. WILSON, a citizen of the United States, residing at the city of Berlin, county of Green Lake, and State of Wisconsin, have invented new and useful Improvements in Repair-Stands, of which the following is a specification.

My invention relates to improvements in that class of stands which are adapted to be used for supporting engines and other similar structures while being assembled or repaired.

The object of my invention is to provide a repair stand having a rotative engine supporting platform to which the engine casting may be bolted with the cylinders and crank bearings exposed, and which may then be held at an elevation convenient for repair work and secured in any desired positions of rotative adjustment while such work is in progress.

My invention is further explained by reference to the accompanying drawing, in which—

Figure 1 represents an end view.

Fig. 2 is a vertical section, drawn on line 2, 2 of Fig. 3.

Fig. 3 is a vertical section, drawn on line 3, 3 of Fig. 1, and

Fig. 4 is a top view.

Like parts are identified by the same reference numerals throughout the several views.

1 is a platform to which an engine or other device is secured by any suitable means. In the construction shown, the upper half of the crank case of the illustrated engine has holes which correspond with holes 2, 2 in the platform 1, and I utilize these to bolt the engine to the platform by ordinary bolts and nuts. The platform 1 is provided with end plates 3, 3, and said plates are clamped to similar plates 4, 4 on the supporting legs, or standards 12, by the clamping rod 5 and wing nut 6. The wing nut has threaded bearings on the end of the rod 5, and said disks, and clamping plates 4, 4, are forced against the plates 3, 3, by turning down said wing nut on said rod. 7 is a tubular spacing shaft which is supported on said rod 5, and is adapted to bear at its respective ends against the inner surface 8 of the plates 3, whereby said plates 3 are relieved from strain such as would otherwise be developed by the clamping pressure of the plates 4, 4. 9 is a washer which is preferably inserted between the wing nut 6 and the circular member 4.

Thus, it is obvious that by turning down the hand nut 6 the member 3 is securely clamped between the ends of the tubular member 7 and the circular members 4, 4, whereby the platform 1 is securely retained at any desired point of adjustment. The platform 1 is preferably provided with an aperture 10 through which bolts may, if desired, be reached in assembling the different parts of an engine. 11 is a stationary shelf or platform which is preferably bolted to the legs or standards 12, 12 near their lower ends. The upper ends of said legs are readily sprung or inclined inwardly sufficiently to secure a clamping pressure as said wing nut 6 is turned to clamping position on said bolt. The bolt 5 is provided at the end opposite said wing nut with a head 13, which bears against the exterior surface of the associated circular member 4, whereby said clamping members 4 are drawn toward each other, and clamped upon said members 3 by the pressure developed by the wing nut 6. The clamping members 4 are preferably provided with a plurality of strengthening flanges 14, whereby they are better adapted to resist the pressure to which they are subjected.

Having thus described my invention what I claim as new and desire to secure by Letters Patent, is:—

1. In a device of the described class, the combination of a set of standards, each provided with a clamping plate at its upper end, a revoluble platform provided at its respective ends with friction bearing surfaces adapted to receive the clamping plates, means for securing an engine or other mechanism to said platform, and means for forcing said clamping plates into binding contact with said bearing surfaces, whereby said platform is retained at any desired place of adjustment.

2. In a device of the described class, the combination of two pairs of legs, each pair being provided with broad friction bearing surfaces, a revoluble platform provided at its respective ends with broad friction bearings adapted to bear against the broad friction bearings of said legs, means for securing an engine or other mechanism to said platform, a rod extending from one of said pair of legs to the other through both of said friction bearings, a tube inclosing said rod between the two opposing friction bearings, and means for rigidly clamping the friction bearings connected with said platform between the friction bearings connected with said legs and said rod inclosing tube, whereby said platform is retained at any desired point of adjustment.

3. In a device of the described class, the combination of a set of standards, each provided with a clamping plate, a revoluble engine support having depending bearing members adapted to be received between the clamping plates, and a clamping bolt extending through the clamping plates and bearing members, and provided with a clamping unit; said standards and clamping plates being adapted to swing inwardly under pressure exerted by the clamping bolt and nut, into engagement with the bearing members.

In testimony whereof I affix my signature in the presence of two witnesses.

LESLIE A. WILSON.

Witnesses:
W. G. BABCOCK,
FRIEDA ALBRECHT.

Copies of this patent may be obtained for five cents each, by addressing the "Commissioner of Patents, Washington, D. C."